United States Patent [19]

Najima et al.

[11] Patent Number: 5,143,493
[45] Date of Patent: Sep. 1, 1992

[54] VIBRATING CUTTING TOOL

[75] Inventors: Kozo Najima; Hirohumi Tsuyuguchi; Tsutomu Aoki; Fukuo Wakano; Masahiro Ida, all of Osaka, Japan

[73] Assignee: Nippon Pneumatic Manufacturing Co., Ltd., Osaka, Japan

[21] Appl. No.: 801,515

[22] Filed: Dec. 2, 1991

[30] Foreign Application Priority Data

Nov. 30, 1990 [JP] Japan .................. 2-339144

[51] Int. Cl.⁵ .............................................. B23C 5/26
[52] U.S. Cl. ...................................... 409/141; 408/143
[58] Field of Search ................. 409/141; 408/17, 141, 408/143, 238

[56] References Cited

FOREIGN PATENT DOCUMENTS 300806 12/1988 Japan ........................................ 408/17
884871 11/1981 U.S.S.R. ................................ 408/143

Primary Examiner—Daniel W. Howell
Attorney, Agent, or Firm—Wenderoth, Lind & Ponack

[57] ABSTRACT

A vibrating cutting tool having an input shaft driven by a live spindle of a machine tool and an output shaft having a cutter mounting portion. The input shaft and the output shaft are coupled together through a coupling mechanism so as to be at least circumferentially movable relative to each other. Recesses are formed in one of the input shaft and the output shaft and holes are formed in the other at locations opposite to the recesses. Moving elements are mounted between the recesses and the holes with a predetermined gap defined between the moving elements and the recesses or the peripheral surfaces of the holes. The gaps serve to restrict a circumferential movement of the moving elements. Springs are provided to urge the moving elements against the recesses. The movement of the moving elements is restricted by stoppers. An adjusting ring may be provided to adjust the biasing force of the springs.

3 Claims, 6 Drawing Sheets

VIBRATING CUTTING TOOL

This invention relates to a cutting tool which can impart vibrations effective for cutting to a rotary cutter such as a drill, an end mill or a tap.

FIG. 7 shows how a work a is cut with a cutter of a conventional cutting tool. b is a cutting edge moving to the lefthand side of the figure. c designates a chip produced by cutting.

The chip c consists of tiny blocks c' produced by compression and shearing with the cutting edge b, which moves back and forth intermittently while repeating compression and shearing as shown by the arrow.

The vibration produced by such back-and-forth movement is a self-excited vibration. Such vibration is generally microscopic in amplitude but this type of cutting may be considered to be vibrating cutting in a broad sense. If its amplitude reaches a certain level due to changes in the cutting conditions, it is called chattering.

FIG. 8-I shows a curve representing waveforms of vibration amplitude produced by the above-described conventional cutting tool, which is very irregular. At portions where the amplitude is small, the edge is likely to be heated while at portions where it is large, the work tends to be scratched remarkably. This worsens the surface roughness.

Heretofore, in order to reduce the amplitude of vibration where it is detrimentally large, a tool mounting structure was used which has as high a rigidity as possible.

But the higher the rigidity of the tool mounting structure, the smaller the amplitude of vibration tends to be at the portions of the curve where the amplitude is small. This may increase the temperature of the chips or the cutter edge or cause the growth of the built-up edge, thus worsening the cutting ability of the cutter.

Thus, to improve the cutting ability, it is necessary to smooth out the vibration as represented by the curve of FIG. 8-II by reducing any larger amplitudes while increasing any smaller ones.

In one known vibrating cutting tool, an external vibration source is used to vibrate the cutting edge forcibly and thus to obtain a uniform vibration curve as shown in FIG. 8-II.

This type of cutting tools having a forcible vibration source have an excellent cutting ability. Many of these cutting tools use, as a vibration generator, electro-striction type or magneto-striction type vibrating elements which are excited by an oscillator. Others use vibrating elements of electro-magnetic vibration type, electro-hydraulic type or mechanical-hydraulic type. Some of them require complicated electric circuits or mechanisms. Others require large-sized and expensive hydraulic cylinders for vibrating a work supporting table. All of them utilize resonance to obtain a suitable amplitude of vibration at the cutter edge. Thus, they can be used only within a limited range of frequency. This makes it difficult to cope with changes in the cutting conditions.

It is an object of this invention to provide a cutting tool which can obtain, as opposed to irregular vibration at the cutter edge as shown in FIG. 8-I, vibration of a uniform amplitude at the cutter edge as shown in FIG. 8-II, irrespective of changes in the cutting conditions, without using a complicated and expensive forcible vibration generator which can be used only within a predetermined range.

In order to solve the above problems, according to this invention, there is provided a vibrating cutting tool comprising an input shaft driven by a live spindle of a machine tool, an output shaft having a cutter mounting portion, means for coupling the input shaft and the output shaft together so as to be at least circumferentially movable relative to each other, one of the input shaft and the output shaft being formed with recesses, the other being formed with holes at locations opposite to the recesses, moving elements mounted partially in the recesses and partially in the holes with a predetermined amount of gap defined between the moving elements and the recesses or the peripheral surfaces of the holes, the gaps restricting circumferential movements of the moving elements, springs mounted in the holes for pressing the moving elements against the recesses, and stoppers mounted in the holes with a predetermined gap defined between the stoppers and the moving elements for restricting the movement of the moving elements in a direction in which the springs are compressed.

An adjusting ring may be further provided to adjust the biasing force of the springs.

To start cutting operation, the input shaft secured to the live spindle of a machine tool is rotated and moved forward together with the live spindle to press the cutter fixedly mounted on the cutter mounting shaft of the output shaft against the work.

In the above cutting process, irregular microscopic vibration is produced at the cutter edge due to fluctuations in the cutting force.

In case of a prior art cutting tool in which the input and output shafts are integral with each other, such vibration at the cutter edge is extremely irregular as represented by the amplitude fluctuation curve shown in FIG. 8-I. In contrast, according to this invention, in which the input shaft and the output shaft are movable relative to each other within a predetermined limited range, the amplitude is smoothed out as shown in FIG. 8-II. In FIGS. 8-I and 8-II, the horizontal axis represents time and the vertical axis represents amplitude.

When the cutter cuts into the work, the turning torque is transmitted from the input shaft to the output shaft through the moving elements pressed against the recesses in the input shaft by the springs.

While the fluctuation of the cutting force is small, the torsional rigidity for torque transmission is small because it is determined mainly by the springs. Thus, the cutter edge can vibrate relatively freely and the amplitude of vibration is large compared with a conventional integral type cutting tool.

When the fluctuation of cutting force grows and thus the springs are compressed to a greater extent, the moving elements displace until they abut the stoppers. Now the output shaft is rotated directly by the input shaft irrespective of the springs. Thus, the torsional rigidity between the input shaft and the output shaft increases to a value near to the value obtained with a conventional integral type cutting tool, thus suppressing the amplitude of vibration at the cutter edge.

The amplitude of vibration at the cutter edge is kept large where it is small with a conventional integral type cutting tool and kept small where it is large with a conventional tool. As a result, the amplitude of vibration is smoothed out as a whole as shown in FIG. 8-II.

According to this invention, the input shaft and the output shaft are circumferentially movably coupled together. Moving elements are mounted between the recesses formed in one of the input and output shafts and the holes formed in the other. The turning torque is transmitted by urging the moving elements against the recesses with the springs. The movement of the moving elements is restricted only in a circumferential direction and a direction in which the springs are compressed within a predetermined range. In this arrangement, among the irregular vibrations produced at the cutter edge of a conventional integral type cutting tool, any part where the amplitude is small grows large, since at this part the torsional rigidity for torque transmission between the input shaft and the output shaft is determined mainly by the springs. Thus, the vibration at the cutter edge is not restricted so much and thus kept large. In contrast, at parts where the amplitude is large, the amplitude at the cutter edge is suppressed since the movement of the moving elements is restricted and thus the torsional rigidity between the input shaft and the output shaft increases. As a result, the amplitude at the cutter edge is smoothed out as a whole. This also makes it possible to reduce fluctuations in the cutting force.

Thus, the feed speed and the number of revolution during cutting can be increased compared with a conventional integral type cutting tool. This contributes to increased productivity, better finished surface roughness of the work after cutting and long life of the tool.

Further, as compared with a cutting tool which utilizes a forcible vibration source, no complicated, large-sized and expensive device is necessary. Its appearance is not different from a prior art integral type cutting tool. Thus, adjustment and handling are easy.

It also has various other advantages including the advantage that it can be used within a large range of vibration frequency.

Other features and objects of the present invention will become apparent from the following description taken with reference to the accompanying drawings, in which.

Figure 8A:
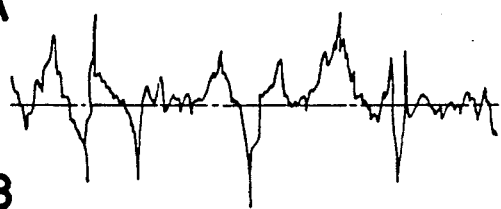
Figure 8B:
Figure 9:
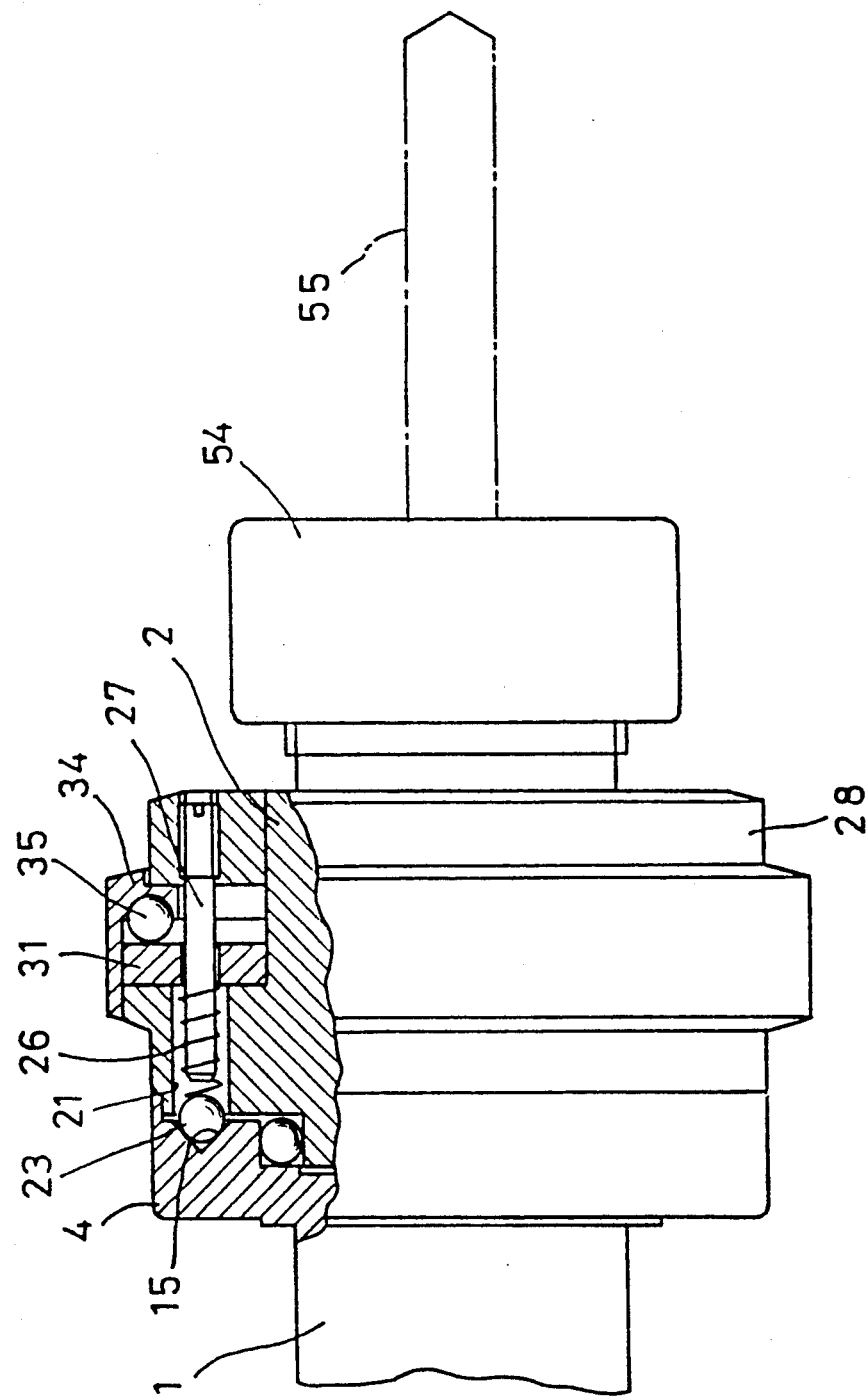

FIGS. 8-A and 8-B show waveforms of the vibration at the respective cutter edges;

FIG. 9 is a partially vertical sectional side view of another embodiment of this invention;

FIGS. 10A-10C and 11A-11C are enlarged sectional views of the vibrating units in the respective embodiments showing how they function.

In the embodiment shown in FIGS. 1-6, numeral 1 designates an input shaft and 2 does an output shaft. The input shaft 1 has a straight shank portion 3 at the rear part thereof and is integrally formed with a flange 4 at the front part thereof.

The input shaft 1 has a center bore 5 in which a small-diameter shank 6 provided at the rear of the output shaft 2 is rotatably mounted. The shank 6 is provided at the rear end thereof with a stepped small-diameter portion 7.

A protrusion 9 is formed on the inner peripheral surface of the center bore 5 at an intermediate portion thereof. A thrust bearing 10 is mounted outside the protrusion 9. A stop bolt 11 is provided at the rear end thereof with a large-diameter head which is supported on the thrust bearing 10. The bolt 11 rotatably extends through the protrusion 9 and is threaded into a small-diameter shank 6.

A plurality of steel balls 13 are mounted between the small-diameter stepped portion 7 and the front side of the protrusion 9.

Figure 1:
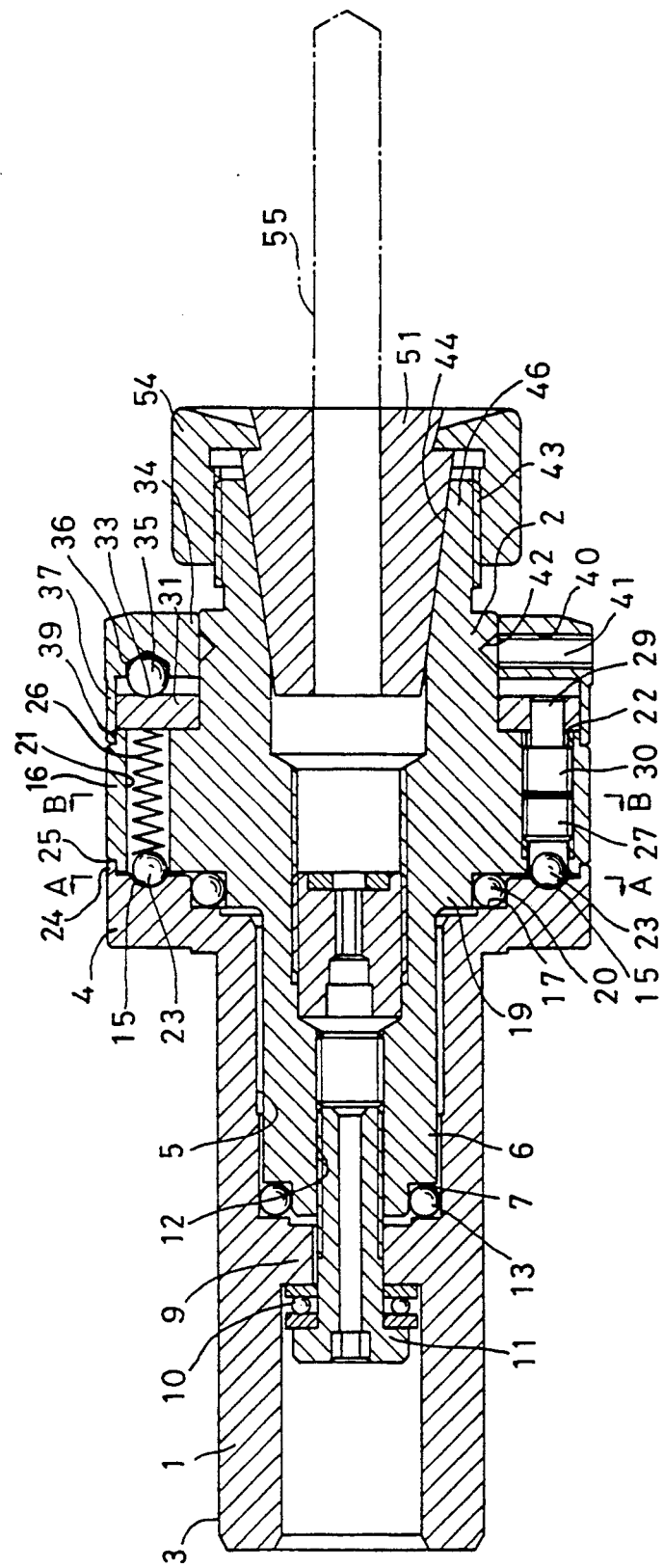
FIG. 1 is a vertical sectional side view of one embodiment of the cutting tool according to this invention.
Figure 2:
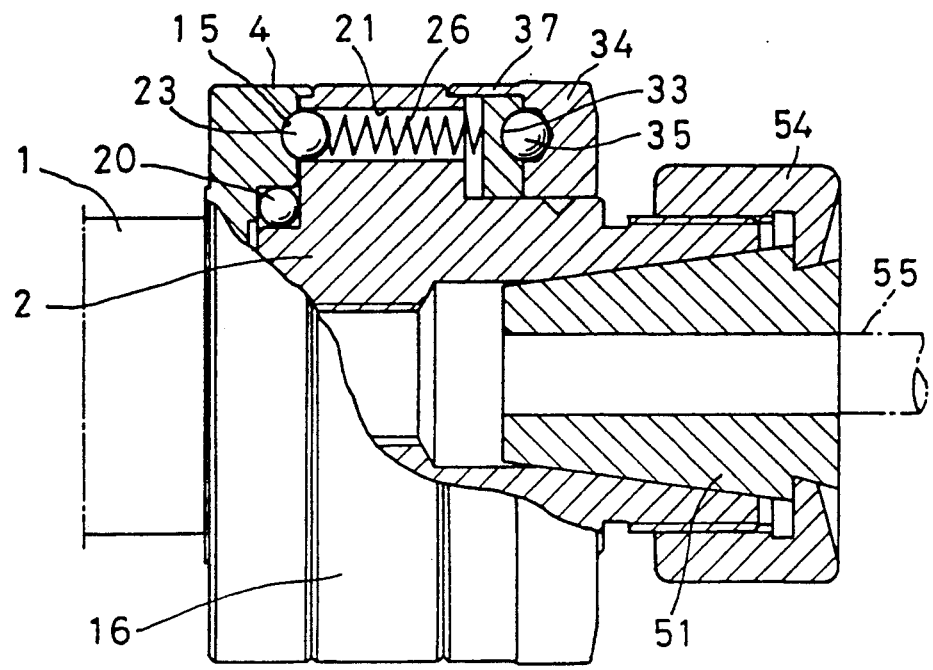
FIG. 2 is a vertical sectional side view of a portion of the same showing the state in which the torque is small.
Figure 3:
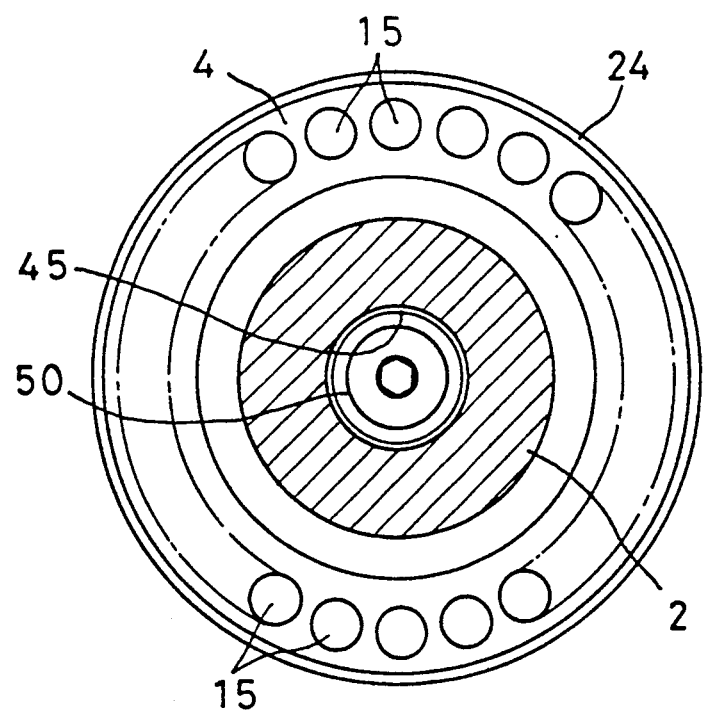
FIG. 3 is a cross-sectional view taken along line A—A of FIG. 1.
Figure 4:
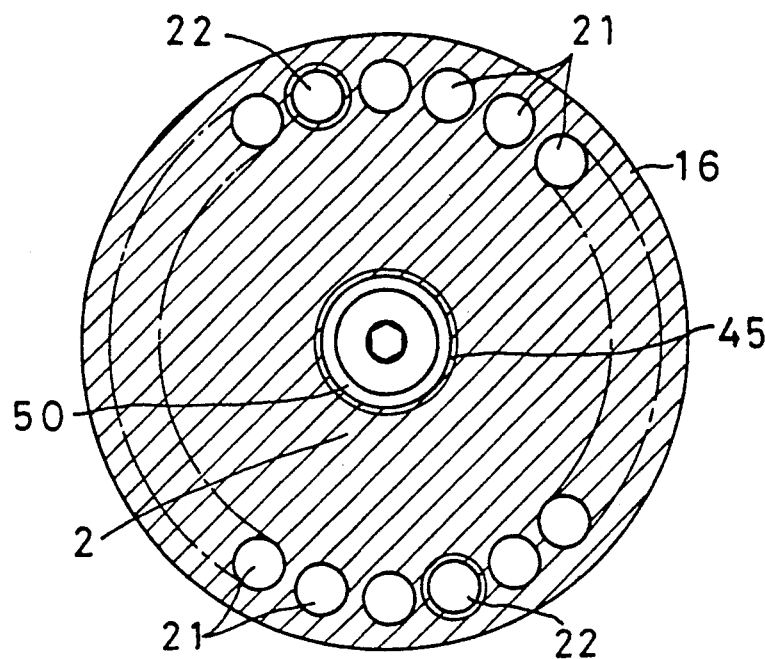
FIG. 4 is a cross-sectional view taken along line B—B of FIG. 1.

As shown in FIGS. 1-3, the flange 4 is formed in the front surface thereof with a plurality of recesses 15 arranged along a circle concentric with the center of the input shaft 1.

Further, the flange 4 is formed in the front inner side thereof with an annular recess 17 extending over the entire circumference thereof. A plurality of steel balls 20 are arranged in the recess 17 on a protrusion 19 formed on a rear end face of a large-diameter portion 16 of the output shaft 2 at the inner part thereof.

As shown in FIGS. 1-4, the output shaft 2 is formed in the large diameter portion 16 with a plurality of axial through holes 21 and threaded holes 22 which are arranged on a circle concentric with the center of the output shaft 2. The through holes 21 and the threaded holes 22 correspond to the recesses 15 formed in the flange 4. The threaded holes 22 are provided at the rate of one for a plurality of through holes 21.

A moving element 23 in the form of a steel ball is fitted in each of the through holes 21 and the threaded holes 22 at the rear end thereof. The moving elements 23 are partially engaged in the recesses 15 of the flange 4.

A spring 26 is mounted in each hole 21 while a setscrew 27 as a stopper means is threaded in each threaded hole 22. A tiny gap is defined between the rear end of the setscrew 27 and each moving element 23. The gap can be adjusted by adjusting the position of the setscrew 27. Further, a setscrew 30 having a roller pin 29 is threaded into the front end of each threaded hole 22. The pins 29 protrude toward the front surface of the large-diameter portion 16.

A ring 31 is slidably fitted on the front side of the large-diameter portion 16 of the output shaft 2. It has holes 32 in which the roller pins 29 fit. (FIG. 5)

Figure 5:
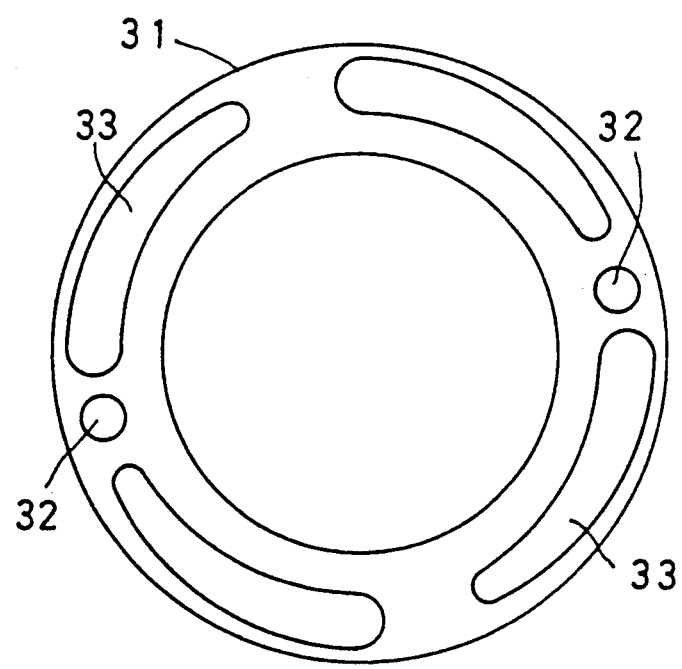
FIG. 5 is a front view of the ring.
Figure 6:
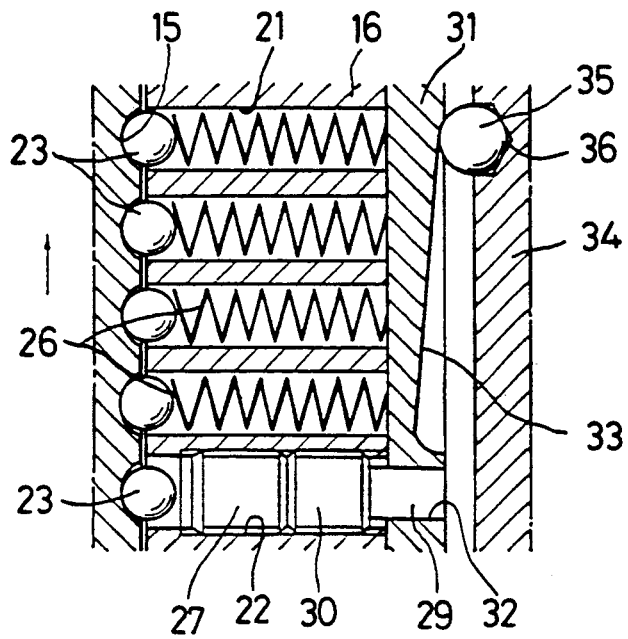
FIG. 6 is an enlarged sectional view of the same showing the function of the moving elements.
Figure 7:
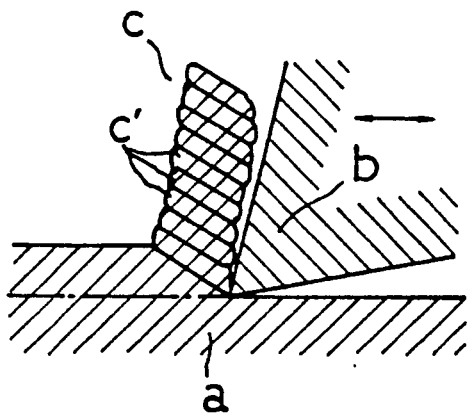
FIG. 7 is an enlarged sectional view of the cutting edge showing its operating state.

As shown in FIG. 5, the ring 31 is formed in the front face thereof with a plurality of arcuate grooves 33 arranged concentrically with the center of the ring. As shown in FIG. 6, each groove 33 has its bottom tapered so that it will become deeper from one end to the other and also have an arcuate cross-section.

An adjusting ring 34 is mounted on the front side of the ring 31. It is formed in the back surface thereof with a plurality of recesses 36 to receive steel balls 35. The ring 34 is integrally formed on the rear portion thereof along the outer edge with a skirt 37 engaging the outer periphery of the ring 31. (FIG. 1) The large-diameter portion 16 is formed in the front portion thereof along the outer edge with a stepped portion 39 to receive the rear end of the skirt 37 of the ring 34.

The adjusting ring 34 is formed with a plurality of radial threaded holes 40 to threadedly receive setscrews 41 having their inner ends engaged in one of a plurality of engaging recesses 42 formed in the outer periphery of the output shaft 2. Thus, the ring 34 is coupled to the output shaft 2.

The output shaft 2 is provided at the front end thereof with a cutter mounting portion 46 which is provided on the outer periphery thereof with male threads 43 and is formed concentrically with a forwardly widening tapered hole 44.

A collet 51 is mounted in the tapered hole 44 and fastened in position with a tightening screw 54 threaded on the male thread 43.

FIG. 9 shows another embodiment. The setscrews 27 have a threadless shank at the tip thereof and have their threaded portions threaded into threaded holes formed in a receiving ring 28 fixed to the output shaft 2. Each recess 15 on the flange 4 has a conical section. Otherwise this embodiment is the same as the first embodiment shown in FIG. 1. Thus, like parts are denoted by like numerals and their description is omitted.

Now we shall describe a vibrating unit which constitutes the main feature of the present invention with reference to FIGS. 1, 6, 9, 10 and 11. It comprises the recesses 15 formed in the flange 4 of the input shaft 1, the through holes 21 and the threaded holes 22 formed in the large-diameter portion 16 of the output shaft 2, moving elements 23 loosely fitted in the recess 15 at the front end of either the through holes 21 or the threaded holes 22, the springs 26 and the setscrews 27 and 30.

Now we shall describe the operation of the embodiments. The input shaft 1 is secured at the straight shank portion 3 to the spindle of a machine tool.

A cutter 55 such as a drill is secured to the cutter mounting portion 46 of the output shaft 2 through the collet 51 and the like.

Figure 10A:
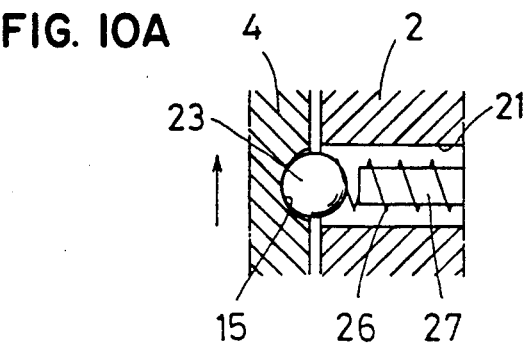
Figure 11A:
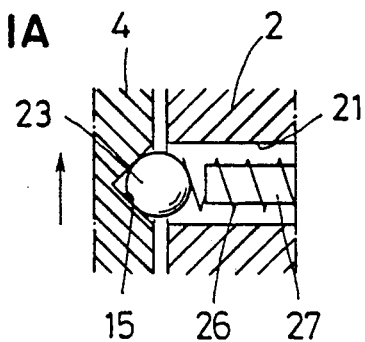

At first, as shown in FIGS. 10A and 11A, the moving elements 23 are biased by the springs 26 against the wall of the recesses 15 in the flange 4, coupling the input shaft 1 and the output shaft 2 together. Thus, the rotation of the input shaft 1 is transmitted to the output shaft 2 and the cutting operation begins.

Figure 10B:
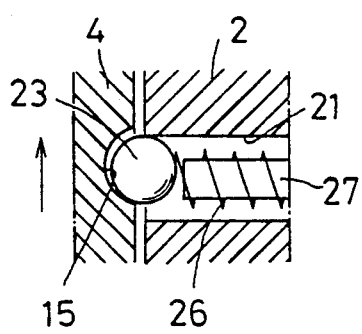
Figure 11B:
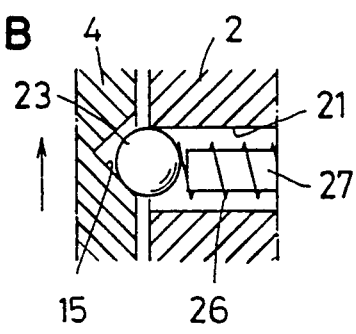
Figure 10C:
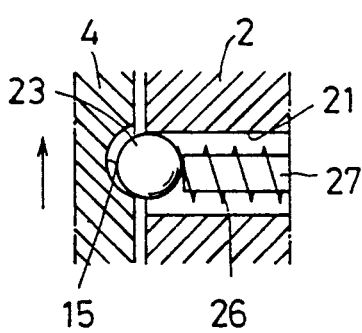
Figure 11C:
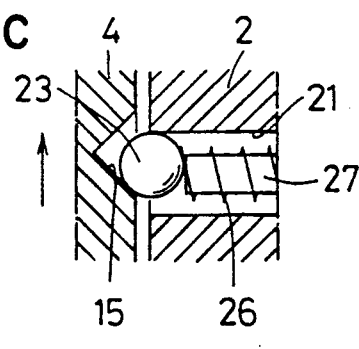

When the cutting operation begins in this state, supposing that the flange 4 integral with the input shaft 1 is rotating in the direction of arrow in the vibration unit shown in FIGS. 10 and 11, because the moving elements 23 biased by the springs 26 are in contact with both the input shaft 1 and the output shaft 2 as shown in FIGS. 10B and 10C and 11B and 11C, the torque is transmitted from the input shaft 1 to the output shaft 2.

As the edge of the cutter 55 cuts into the work, irregular microscopic vibration occurs at the edge of the cutter 55. This vibration at the cutter edge is transmitted to the vibrating unit through the output shaft 2, causing the moving elements 23 shown in FIGS. 10 and 11 to repeatedly move back and forth microscopically. Such repeated movement, i.e. vibration, is composed chiefly of a microscopic rolling vibration and the moving elements 23 are always kept in contact with the curved or straight surfaces of the recesses 15. The amplitude of vibration of the moving elements 23 is no more than several ten microns. They never vibrate in such a way that the moving elements 23 rebound or jump several millimeters off the recesses 15. Of course, the setscrews 27 as stoppers never allow such a movement.

As described above, while the moving elements 23 are pressed against the inner peripheral surfaces of the through holes 21 at their ends, the springs 26 are compressed. While the cutting force is small, as shown in FIGS. 10B and 11B, the torsional rigidity of the vibrating unit in transmitting torque is mainly determined by the springs 26 and thus is relatively small. Since the vibration at the cutter edge is not limited so much in this state, the amplitude of vibration at the cutter edge is kept large within the range in which the effect of cutting is large, when compared with a conventional integral type cutting tool.

As the cutting force at the cutter edge grows and thus the springs 26 are compressed to a greater degree, as shown in FIGS. 10C and 11C, the relative position of the moving elements 23 changes. This also changes the relation of torque transmission between the input shaft 1 and the output shaft 2. Namely, the moving elements 23 abut the inner peripheral surfaces of the through holes 21 and the end faces of the setscrews 27. Thus, the output shaft 2 is directly coupled to and driven by the input shaft 1 through the moving elements 23, irrespective of the springs 26. Thus, the total torsional rigidity of the vibrating unit increases to a level near the value obtained with a conventional integral type cutting tool. As a result, the amplitude of vibration at the cutter edge reduces or is limited within a range in which the effect of cutting is kept large.

Thus, any excessive amplitude at the cutter edge is suppressed while vibrations having smaller amplitudes grow larger than with a conventional integral type cutting tool. Thus, the amplitude of vibration is smoothed out as shown in FIG. 8-II.

We have described the operation of the embodiment of FIG. 9 with reference to FIGS. 10 and 11. The operation of the first embodiment shown in FIGS. 1-6 is similar to the operation of the embodiment of FIG. 9.

Namely, while the cutting force is small, the gap between the moving element 23 and the setscrew 27 (FIG. 6) is maintained and they do not abut each other. Thus, the torsional rigidity of the vibrating unit in transmitting torque is mainly determined by the springs 26, so that the amplitude of vibration at the cutter edge is relatively large.

When the cutting force at the cutter edge increases and the springs 26 are compressed to a greater degree, the moving elements 23 will abut the ends of the setscrews 27 in the threaded hole 22. Now the output shaft 2 is directly coupled to the input shaft 1 through the moving elements 23, so that the total torsional rigidity of the vibrating unit increases and thus the amplitude of vibration at the cutter edge is limited.

In order to change the biasing force exerted by the springs 26 on the moving elements 23, after loosening the setscrews 41 in the adjusting ring 34, the ring 34 is turned with respect to the output shaft 2. The balls 35 rollable together with the ring 34 will move in the grooves 33 so that the rings 31 move axially as shown in FIG. 2, changing the biasing forces of the springs 26.

The gap between the moving elements 23 and the setscrews 27 can be adjusted by moving the setscrews 27 in the threaded holes 22 or the through holes 21.

After adjusting the positions of the setscrews 27 and the force of the springs 26, the setscrews 41 are tightened into engagement with the respective recesses 42. Thus, the amplitude and frequency of the vibration at the cutter edge can be adjusted to values effective in cutting.

In the above embodiments, the vibrating unit is shown to be arranged axially. Namely, the recesses 15 are formed in the end face of the input shaft 1 and the moving elements 23 are biased by the springs 26 inserted in the axial through holes 21 formed in the output shaft 2, with the setscrews 27 being inserted in the through holes 21 or the threaded holes 22. But a radially-arranged vibrating unit is equally effective. For example, the recesses 15 may be formed in the outer periphery of the output shaft 2. In this case, the through holes 21 or the threaded holes 22 are formed in the input shaft 1 in a radial direction. The springs 26 are mounted in the through holes 21 to urge the moving elements 23 against the wall of the recesses 15. The setscrews 27 are of course inserted in the radial through holes 21 or the threaded holes 22.

Further, the recesses 15 and the springs 26 may be arranged opposite to the arrangement of the embodiment of FIG. 1. That is, the former may be provided in the output shaft 2 and the latter in the input shaft 1.

What is claimed is:

1. A vibrating cutting tool comprising an input shaft driven by a live spindle of a machine tool, an output shaft having a cutter mounting portion, means for coupling said input shaft and said output shaft together so as to be at least circumferentially movable relative to each other, one of said input shaft and said output shaft being formed with recesses, the other being formed with holes at locations opposite to said recesses, moving elements mounted partially in said recesses and partially in said holes with a predetermined amount of gap defined between said moving elements and said recesses or the peripheral surfaces of said holes, said gaps restricting circumferential movements of said moving elements, springs mounted in said holes for pressing said moving elements against said recesses, and stopper means mounted in said holes with a predetermined gap defined between said stopper means and said moving elements for restricting the movement of said moving elements in a direction in which said springs are compressed.

2. A vibrating cutting tool as claimed in claim 1, further comprising a retractable ring supporting said springs and an adjusting ring provided at the front side of said ring to adjust the axial position of said ring.

3. A vibrating cutting tool as claimed in claim 1, wherein the position of said stopper means with respect to said moving elements is adjustable to adjust the gap between said moving elements and said stopper means.

* * * * *